(12) United States Patent
Lu et al.

(10) Patent No.: US 12,393,605 B2
(45) Date of Patent: Aug. 19, 2025

(54) DATA PROCESSING METHOD FOR DISTRIBUTED DATABASE, ELECTRONIC DEVICE, AND MACHINE READABLE MEDIUM

(71) Applicant: HANGZHOU ALICLOUD FEITIAN INFORMATION TECHNOLOGY CO., LTD., Hangzhou (CN)

(72) Inventors: Biao Lu, Hangzhou (CN); Yanfeng Lin, Hangzhou (CN); Xueqiang Wu, Hangzhou (CN); Youyou Deng, Hangzhou (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/685,166

(22) PCT Filed: Sep. 30, 2022

(86) PCT No.: PCT/CN2022/123165
§ 371 (c)(1),
(2) Date: Feb. 20, 2024

(87) PCT Pub. No.: WO2023/061249
PCT Pub. Date: Apr. 20, 2023

(65) Prior Publication Data
US 2024/0362253 A1 Oct. 31, 2024

(30) Foreign Application Priority Data
Oct. 11, 2021 (CN) .......................... 202111184072.2

(51) Int. Cl.
*G06F 16/23* (2019.01)
*G06F 16/27* (2019.01)

(52) U.S. Cl.
CPC .......... *G06F 16/27* (2019.01); *G06F 16/2365* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 11,381,496 B1 * | 7/2022 | Ananthapadmanabh | .................... H04L 43/50 |
| 2015/0309889 A1 * | 10/2015 | Campbell | ............... G06F 9/466 714/16 |

(Continued)

FOREIGN PATENT DOCUMENTS

| CN | 109977171 A | 7/2019 |
|---|---|---|
| CN | 113193947 A | 7/2021 |

(Continued)

OTHER PUBLICATIONS

Oracle, "XA and Oracle Controlled Distributed Transactions", Jun. 2010, 29 pages. (Year: 2010).*

(Continued)

*Primary Examiner* — Scott A. Waldron
(74) *Attorney, Agent, or Firm* — Armstrong Teasdale LLP

(57) ABSTRACT

A data processing method and system for a distributed database, and a device and a storage medium. The method comprises: sorting transactions in a transQueue by using a global timestamp TSO, creating a local transaction list by means of an XA Event and a waitTrans in the transQueue, and generating first-level sorting queues according to the local transaction list (102); for the first-level sorting queue of each DN, performing multi-path merging and sorting, so as to generate a global sorting queue (104); and for the (Continued)

sorting Transactions in a transQueue by using the global timestamp TSO, creating a local transaction list through the XA Event and waitTrans in the transQueue, and generating a first-level sorting queue according to the local transaction list —102 performing a multiplexed merge sorting on the first-level sorting queue of each DN to generate a global sorting queue —104 merging, for the global sorting queue, local Transactions with an identical global timestamp TSO and generating a global binary log Binlog —106 global sorting queue, merging local transactions that have the same global timestamp TSO, and generating a global binary log Binlog (106).

20 Claims, 5 Drawing Sheets

(56)  References Cited

U.S. PATENT DOCUMENTS

2019/0235974 A1\*  8/2019  Pardon ................ G06F 11/2094
2019/0332582 A1\* 10/2019  Kumar ................. G06F 16/254
2023/0099664 A1\*  3/2023  Li ....................... G06F 16/2365
                                                          707/703

FOREIGN PATENT DOCUMENTS

| CN | 113297320 A |   | 8/2021 |              |
|----|-------------|---|--------|--------------|
| CN | 114003657 A |   | 2/2022 |              |
| CN | 110196856 B | \* | 8/2022 | ......... G06F 16/2329 |

OTHER PUBLICATIONS

International Search Report for PCT/CN2022/123165, dated Dec. 15, 2022, 3 pages.

\* cited by examiner

DATA PROCESSING METHOD FOR DISTRIBUTED DATABASE, ELECTRONIC DEVICE, AND MACHINE READABLE MEDIUM

The present application is the 35 U.S.C. § 371 U.S. National Phase of International Patent Application No. PCT/CN2022/123165, filed Sep. 30, 2022, which claims priority to Chinese patent application No. 202111184072.2, filed before the Chinese Patent Office on Oct. 11, 2021, and entitled "Data Processing Method and System for Distributed Database, and Device, and Storage Medium", which are incorporated herein by reference in their entirety.

TECHNICAL FIELD

The present application relates to a field of computer technologies, and in particular, to a data processing method and system for a distributed database, an electronic device, and a storage medium.

BACKGROUND

MySQL is an open-source relational database system, and takes a place in the technology stacks of most enterprises worldwide. It is estimated that there are tens of thousands of downloads per day. MySQL database is regarded as the first selection by many developers, administrators, and IT managers of high-performance databases due to its high reliability, economy, easy use, and other characteristics. MySQL has an open and strong CDC (Change Data Capture) capability. Various replication chains may be constructed by a Binlog based on MySQL, and a variety of business scenarios may be supported by synchronizing changed data into systems such as caching system, indexing system, and big data platform.

SUMMARY

Embodiments of the present application provide a data processing method for a distributed database.

Correspondingly; the embodiments of the present application further provide a data processing system for a distributed database, an electronic device, and a storage medium for ensuring implementation and application of the above method.

The embodiments of the present application disclose a data processing method for a distributed database, wherein the distributed database has a plurality of data nodes DNs having corresponding physical binary logs Binlogs for storing local transaction operation information XA Event for a distributed transaction XA. The XA at least includes one local Transaction composed of the XA Event. The XA has a corresponding global timestamp TSO. The data processing method for the distributed database in the embodiments of the present application may include: sorting Transactions in a transQueue by using the global timestamp TSO, creating a local transaction list through the XA Event and waitTrans in the transQueue, and generating a first-level sorting queue according to the local transaction list; performing a multiplexed merge sorting on the first-level sorting queue of each DN to generate a global sorting queue; merging, for the global sorting queue, local Transactions with an identical global timestamp TSO and generating a global binary log Binlog.

The embodiments of the present application further disclose a data processing system for a distributed database, wherein the distributed database has a plurality of data nodes DNs which have corresponding physical binary logs Binlogs for storing local transaction operation information XA Event of a distributed transaction XA. The XA at least includes one local Transaction composed of the XA Event. The XA has a corresponding global timestamp TSO. The data processing system for the distributed database in the embodiments of the present application may include: a first-level sorting module for sorting Transactions in a transQueue by using the global timestamp TSO, creating a local transaction list through the XA Event and waitTrans in the transQueue, and generating a first-level sorting queue according to the local transaction list: a global sorting module for performing a multiplexed merge sorting on first-level sorting queue of each DN to generate a global sorting queue: a transaction merge module for merging, for the global sorting queue, local Transactions with an identical global timestamp TSO and generating a global binary log Binlog.

The embodiments of the present application further disclose an electronic device, including a processor: and a memory stored thereon with executable codes which, when executed, enable the processor to execute one or more of the data processing methods for distributed databases in the embodiments of the present application.

The embodiments of the present application further disclose one or more machine readable media stored thereon with executable codes which, when executed, enable the processor to execute one or more of the data processing methods for distributed databases in the embodiments of the present application.

The foregoing summary is for purposes of illustration only and is not intended to be limiting in any way. In addition to the illustrative aspects, embodiments and features described above, further aspects, embodiments and features of the present application will be readily apparent by reference to the accompanying drawings and the following detailed description.

BRIEF DESCRIPTION OF THE DRAWINGS

In the accompanying drawings, unless otherwise specified, the same reference numerals throughout the plurality of accompanying drawings indicate the same or similar components or elements. These accompanying drawings are not necessarily drawn to scale. It should be understood that these accompanying drawings depict only some of the embodiments disclosed in accordance with the present application and should not be considered as limiting the scope of the present application.

DETAILED DESCRIPTION

In order to make the above objects, characteristics and advantages of the present application more readily understood, the present application is further described below in a detailed manner in conjunction with the accompanying drawings and the embodiments.

In the relevant technologies, a CDC solution for a distributed database is presented in a plurality of forms below:
1. Row-level ordered replication solution: it ensures that the replication sequence of a single row of data is consistent with the upstream changed sequence, generally performs Hash (hash function operation) based a primary key, and performs data distribution and subscription in cooperation with message-oriented middleware;
2. Table-level ordered replication solution: it ensures that the replication sequence of all data in a single table is consistent with the upstream changed sequence, generally performs Hash based on the table name TableName, and performs data distribution and subscription in cooperation with message-oriented middleware;
3. Node-level ordered replication solution: it ensures that the replication sequence of all data at a single data node is consistent with the upstream changed sequence, and is generally used in a scenario of distributed MySQL Sharding;
4. Globally ordered replication solution, it ensures that the replication sequence of all data in a database is consistent with the sequence of executing upstream distributed transactions, which generally needs introduction of a global timestamp.

Although the three replication solutions mentioned above, i.e., row-level ordered, table-level ordered, and node-level ordered replication solutions, are friendly to high concurrency and high throughput, they are quite unfriendly to DDL (Data Definition Language), and cannot implement DDL replication, thus having weak capability for guaranteeing data consistency.

As for a globally ordered replication solution, the vast majority of the current distributed databases still do not have a capability for globally ordered replication, and are also different in terms of data exchange format mainly with message-oriented middleware as a medium in the subscription manner, thereby leading to weak capability for CDC services and high cost in access.

Figure 1:
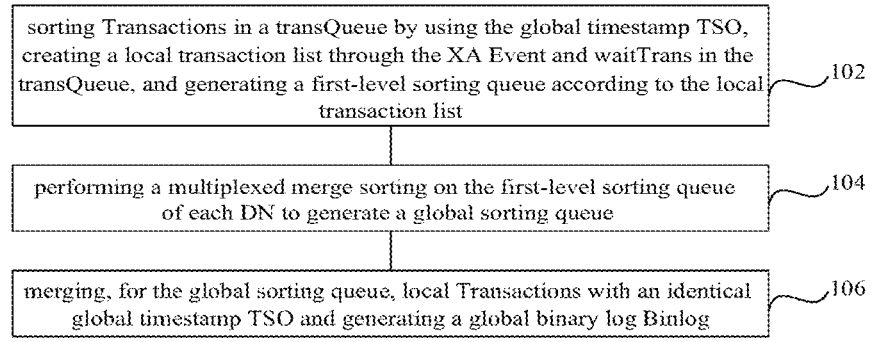
FIG. 1 is a flow diagram of steps of an embodiment of a data processing method for a distributed database in the present application.

Embodiments of the present application provide a data processing method for a distributed database to solve the problem of being unable to ensure the global orderliness and integrity of transactions during the process of data replication for a distributed database, and to be fully compatible with the data replication standard of MySQL Referring to FIG. 1, which is a flow diagram of steps of an embodiment of a data processing method for a distributed database in the present application, and may specifically include Step S102 to Step S106 below.

At Step 102, sorting Transactions in a transQueue by using the global timestamp TSO, creating a local transaction list through the XA Event and waitTrans in the transQueue, and generating a first-level sorting queue according to the local transaction list.

At Step 104, performing a multiplexed merge sorting on the first-level sorting queue of each DN to generate a global sorting queue.

At Step 106, merging, for the global sorting queue, local Transactions with an identical global timestamp TSO and generating a global binary log Binlog.

In the embodiments of the present application, the distributed database may have a plurality of data nodes DNs which may have corresponding physical binary logs Binlogs. The physical binary logs Binlogs may be used to store local transaction operation information XA Event of a distributed transaction XA. The XA at least includes a local Transaction which may be composed of the XA Event, and the XA may have a corresponding global timestamp TSO.

In order to enable those skilled in the art to better understand the solution of the present application, the terms involved in the present application are illustrated briefly below:

'DN': storage node, Data Node.
'MySQL InnoDB': database engine.
'TSO': a global timestamp, Timestamp Oracle.
'XA': extended Architecture, a distributed transaction.
'XA protocol': a distributed transaction processing specification.
'Binary log Binlog': for recording DDL and DML (data manipulation language) sentences in a form of events, and further including the time consumed for executing sentences:
'2PC' (two-phase commit): 2PC is an atom commit protocol which is strongly consistent and centralized, and is a commit protocol that can ensure atomicity and durability. There are a plurality of components participating in transactions with each component recording respective operation logs which are separate, not centralized.
'MVCC' (Multi-version Concurrent Control): for multi-version control over data during concurrent access to a database to avoid the blocking of read operations induced by write locks, thereby better optimizing the concurrent blocking problem.
'While loop': It is a basic loop mode of computers. A loop is entered when a condition is satisfied. After the loop is entered, the loop is jumped out when the condition is not satisfied.
'Logical library table': a table with a plurality of Sharding partitions in the scenario of distributed MySQL Sharding, that is, a library table which is directly visible and usable to the outside.
'Physical library table': a Sharding library table belonging to a logical library table on each MySQL node in the scenario of distributed MySQL Sharding.
'Physical Binlog': Binlog on each MySQL node in the scenario of distributed MySQL Sharding.

In some embodiments, the embodiments of the present application may implement a MVCC mechanism in a form of XA Protocol+2PC+TSO on the basis of MySQL InnoDB prior to data replication in a distributed database, may extend a list Sequence in prior to the commit event XA Commit Event at the second stage of local transactions of the native MySQL, for recording a commit event timestamp Commit TSO at the second stage of the transactions, and write the recorded Commit TSO into a physical Binlog.

In some embodiments, a distributed database in the embodiments of the present application may include a plurality of data nodes DNs which may be MySQL. Each DN may have a corresponding physical binary log Binlog which may be used to store local transaction operation information XA Event of a distributed transaction XA. The XA at least includes a local Transaction which may be composed of XA Events. The XA may have a corresponding global timestamp TSO.

In some embodiments, by applying the embodiments of the present application, local Transactions recorded in respective physical binary logs Binlogs may be sorted, and thus a local transaction list corresponding to respective data nodes DNs may be created. After the local transaction list is created, a first-level sorting queue corresponding to the local transaction list may also be generated for the local transaction list. This means that a DN corresponds to a first-level sorting queue, and at the same time, the first-level sorting queue may also be regarded as a partially-ordered set.

In some embodiments, a distributed database may have a plurality of DNs. Each DN may have its physical local transaction list. After a first-level sorting queue for each DN is completed, a first-level sorting queue which is locally ordered may be obtained at each DN. The local transaction list may be used to generate the first-level sorting queue. At this time, first-level sorting queues corresponding to a multiplexed local transaction list may be merged, and may be sorted through the global timestamp TSO so as to generate a global sorting queue which may be composed of globally ordered local Transactions. Meanwhile, the global sorting queue may be deemed as a full-ordered set.

In some embodiments, the XA is at least associated with one of the DNS. As for the same XA, all local Transactions on the DNs associated with the same XA have an identical TSO.

An XA in some embodiments is at least associated with a DN. As for the same XA, all local Transactions on DNs associated with the same XA have an identical TSO.

In practical application, for an XA, at least one DN will participate therein. For the same XA, Commit TSOs on all DNs participating in the XA are identical.

It may be known from above that in the embodiments of the present application, local Transactions with an identical global timestamp TSO may be merged in the global sorting queue, and then a global binary log Binlog may be generated. The global binary log Binlog may record local Transactions in a plurality of DNs. Further, the local Transactions recorded in the global binary log Binlog are globally ordered.

In the embodiments of the present application, Transactions in the transQueue are sorted by using a global timestamp TSO, a local transaction list is created through the XA Event and the waitTrans in transQueue, and a first-level sorting queue is generated according to the local transaction list. A multiplexed merge sorting is performed on the first-level sorting queue for respective DNs to generate a global sorting queue. For the global sorting queue, local Transactions with an identical global timestamp TSO are merged, and a global binary log Binlog is generated. The embodiments of the present application can ensure that transactions have global orderliness and integrity during data replication in a distributed database. Meanwhile, a strong consistency effect may also be achieved, and therefore data replication may be implemented in the scenario of high requirements for data consistency. For example, in the transfer scenario, a user may always find a correct result when querying the total account balance in a backup database. In addition, the global binary log Binlog is fully compatible with the Binlog format of native MySQL in terms of data format, and has a strong ecological compatibility.

On the basis of the embodiments mentioned above, variant embodiments of the above embodiments are proposed. It should be noted here that for brief description, only differences from the above embodiments are described in the variant embodiments.

In some embodiments of the present application, the Step 102 of sorting local Transactions corresponding to respective physical binary logs Binlogs to create the local transaction list includes: reading the XA Event in the physical binary logs Binlogs, and pushing the read XA Event into a preset sorting item queue sortItemsQueue: pushing the xid into a preset waiting transmission queue waitTrans, when the XA prepare is read: removing the xid from the waitTrans, when the XA Commit or the XA Rollback is read: merging the XA Prepare corresponding to the XA Commit through the xid to generate a local Transaction when the XA Commit is read, and pushing the Transaction into a preset transmission queue transQueue: sorting Transactions in the transQueue by using the global timestamp TSO, creating the local transaction list through the XA Event and the waitTrans in the transQueue, and generating the first-level sorting queue according to the local transaction list.

In an example of the embodiments in the present application, the XA Event includes first-phase commit information XA Prepare, second-phase commit information XA Commit, and rollback information XA Rollback. For a local Transaction, the XA Prepare, the XA Commit, and the XA Rollback have an identical transaction identifier xid.

In some implementations, an XA in the embodiments of the present application may include first-phase commit information XA Prepare, second-phase commit information XA Commit, rollback information XA Rollback, and other transaction information. For a local Transaction, the XA Prepare, the XA Commit, and the XA Rollback have an identical transaction identifier xid. As such, for the same local Transaction, the global timestamps TSOs are identical no matter whether the XA Prepare, the XA Commit, and the XA Rollback thereof are stored in the same DN.

In some embodiments, the basis of XA transactions may be a two-phase commit protocol 2PC, where a transaction coordinator is needed to ensure that all transaction participants complete preparation, i.e., the first-phase commit information XA Prepare. If a message that all participants are ready is received, the coordinator will notify that all transactions can be committed, i.e., the second-phase commit information XA Commit.

XA transactions may be categorized into internal XAs and external XAs, where the external XAs may participate in external distributed transactions, and an application layer is required to intervene as a coordinator. The internal XA transactions may be used across multiple MySQL InnoDBs in the same instance, and Binlog serves as a coordinator. For example, when a MySQL InnoDB is committed, the commit information needs to be written in a binary log Binlog, and this is an internal distributed XA transaction. A participant of the binary log Binlog may be MySQL itself.

In order to enable those skilled in the art to better understand the embodiments of the present application, a local transaction XA is illustrated with a specific example used below.

XA transaction in MySQL may include: XA {START|BEGIN} xid [JOIN|RESUME]—start a XA transaction [xid must be a unique value: (JOIN|RESUME) sentence is not supported]: XA END xid [SUSPEND (FOR MIGRATE)]—end an XA transaction ([SUSPEND [FOR MIGRATE]] sentence is not supported): XA PREPARE xid—prepare: XA COMMIT xid [ONE PHASE]—commit an XA transaction: XA ROLLBACK xid—roll back an XA transaction: XA RECOVER—check all XA transactions at the PREPARE stage.

The transaction identifier 'xid': xid is a transaction identifier which is provided by a client or generated by a MySQL server.

The format of xid is generally as follows: xid: gtrid [, bqual [, formatID]]: gtrid is a global transaction identifier: bqual is a branched qualifier: formatID is a number for identifying a format used by gtrid and bqual values. According to the representation of the grammar, bqual and formatID are self-selected. If not given, a default bqual value is ''. if not given, a default formatID value is 1.

The development processes of the state of an XA transaction are as follows:

1. An XA transaction is started with XA START, and is set to an ACTIVE state.

2. For an ACTIVE transaction, an SQL statement forming the transaction is issued, and an XA END statement is then issued, the transaction is set to an IDLE state by XA END.

3. For an IDLE XA transaction, an XA PREPARE statement or an XACOMMIT . . . ONEPHASE statement is issued: the former sets the transaction to a PREPARE state, at which time, the output of the XA RECOVER statement contains an xid value of the transaction (all XA transactions in the PREPARE state will be listed by the XA RECOVER statement); the latter is used to prepare and commit a transaction which will not be listed by XARECOVER because the transaction has been terminated.

4. For a PREPARE XA transaction, an XA COMMIT statement may be issued to commit and terminate a transaction, or a XA ROLLBACK statement may be issued to roll back and terminate a transaction.

In some embodiments, global timestamps TSOs are disorderly in a physical Binlog file. In order to realize global orderliness of MySQL, a first-level sorting of DNS may be preferably completed. In the embodiments of the present application, an xid may be firstly pushed into a preset waiting transmission queue waitTrans when XA Prepare is read, the xid may be removed from waitTrans when XA Commit or XA Rollback is read. In the subsequent process of first-level sorting, when XA Prepare is received, it is then known whether a corresponding XA Commit is received. When the XA Commit is read, a Transaction corresponding to XA Commit is pushed into a preset transmission queue transQueue, and in the transQueue, Transactions are sorted through the acquired XA Prepare, XA Commit, XA Rollback, and a global timestamp TSO corresponding to XA Commit to obtain a first-level sorting queue for Transaction in a DN.

In some embodiments, the step of creating a local transaction list through the XA Event and the waitTrans in the transQueue further includes: sequentially acquiring the XA Event from the sortItemsQueue: extracting the xid when the XA Prepare is acquired, and determining whether the XA Commit with an identical xid is received: removing the XA Prepare from the sortItemsQueue if the XA Commit with the identical xid is received, and acquiring the XA Event from the sortItemsQueue again: stopping acquiring the XA Event from the sortItemsQueue if the XA Commit with the identical xid is not received: removing the XA Commit from the sortItemsQueue when the XA Commit is acquired: removing the XA Rollback from the sortItemsQueue when the XA Rollback is acquired: determining a maximum timestamp maxTSO in the transQueue, and determining whether the global timestamp TSO corresponding to the XA Commit is greater than the maxTSO: using the global timestamp TSO as a new maximum timestamp maxTSO if the global timestamp TSO corresponding to the XA Commit is greater than the maxTSO: creating a local transaction list by using Transactions with a TSO smaller than or equal to the maxTSO in the transQueue as safe transactions, and generating the first-level sorting queue by using the local transaction list, where the first-level sorting queue is composed of ordered local Transactions.

In some embodiments, after the step of sequentially acquiring the XA Event from the sortItemsQueue, the method may further include: determining whether the XA Event acquired from the sortItemsQueue is null; stopping acquiring the XA Event from the sortItemsQueue if the XA Event acquired from the sortItemsQueue is null.

In some embodiments, the step of sequentially acquiring the XA from the sortItemsQueue, the method may further include: determining whether a duration of the XA Event acquired from the sortItemsQueue exceeds a preset threshold: stopping acquiring the XA Event from the sortItemsQueue if the duration of the XA Event acquired from the sortItemsQueue exceeds the preset threshold.

In some embodiments, before the step of creating a physical binary log Binlog by using a Transaction with a TSO smaller than or equal to the maxTSO, the method may further include: determining whether the Transaction is null; the XA Event in the physical binary log Binlog may be read again if the Transaction is null, and the read XA Event may be pushed into a preset sorting item queue sortItemsQueue.

In some implementations, for an XA (XA Prepare+XA Commit), if XA Prepare or XA Commit of another transaction is interspersed between the XA Prepare and the XA Commit thereof, this is referred to as a transaction void (null) present between these transactions. The transaction void in Binlog is specifically manifested as that: there is a commit log of another local transaction XA between XA Prepare and XA Commit of a certain local transaction XA.

For example, assuming that there are transactions XA1 and XA2, XA Prepare is referred to P for short, XA Commit is referred to as C for short. If there is a void, it is manifested in Binlog as: P1 P2 C1 C2, P1 P2 C2 C1, P2 P1 C1 C2, P2 P1 C2 C1. If there are no void, it is manifested in Binlog as: P1 C1 P2 C2, P2 C2 P1 C1.

By combining the development process of states of the above XA transactions, three theorems may be deduced, specifically including:

Theorem 1

Definition: If there is a void between two transactions, there is no happen before constraint between the two transactions prior to occurrence thereof. That is, there is necessarily no write conflict between two local transactions, and adjusting the order of the transactions will not lead to any data consistency problem.

It is proved by using proof by contradiction that a concurrent transaction with a write conflict will be converted into a serial relationship by an exclusive lock. Thus, it is impossible for a transaction with a write conflict to enter the XA Prepare stage concurrently. As such, there is no condition to trigger a void, which is hereby proven.

Theorem 2

Definition: If there is a void between two transactions, the size of the Commit TSO of the two transactions is not related to the sequence of Commit. That is, the Commit TSO of the transaction that commits earlier is not necessarily greater than the Commit TSO of the transaction that commits later. For example, in the scenario of P1 P2 C1 C2, the Commit TSO of C1 may be possibly greater than C2, and may also possibly be smaller than C2.

Proof: It may be known from Theorem 1 that there must be no write conflicts between transactions with null relationships (void relation), and then Commits of the transactions are random, and since acquiring Commit TSO and Commit is not an atomic operation, a transaction where Commit is initiated first may carry a smaller Commit TSO, which is hereby proved.

Theorem 3

Definition: If there is no void between two transactions, the size of the Commit TSO of the two transactions is positively related to the sequence of the Commit. That is, the Commit TSO of the transaction that commits earlier is necessarily smaller than or equal to the Commit TSO of the transaction that commits later. For example, in the scenario of P1 C1 P2 C2, the Commit TSO of C1 is necessarily smaller than or equal to the Commit TSO of C2.

Proof: When there is no void between transactions T1 and T2, that is, when the condition such as P1 C1 P2 C2 is satisfied, combined with the characteristics of the 2PC transaction mentioned above, it may be known that:

a. For Transaction T1, when C1 is committed, all sharded P1s are definitely committed.

b: For Transaction T2, when C2 is committed, all sharded P2s are definitely committed.

Hence, it may be seen from the sequence of occurrence that C1⇒P2, and P2⇒C2, as such, C1⇒C2 ("⇒" represents "occurring before"). That is, C1 definitely occurs before C2, and C1 and C2 will not be concurrent, which is hereby proved.

Conclusion: it may be known from Theorems 1 and 2 that the disorderly scenario of Commit TSO indeed exists, but sorting will not cause the data consistency problem. It may be known from Theorem 3 that a disorder only occurs in the scenario where there is a void (null) between transactions.

Figure 2:
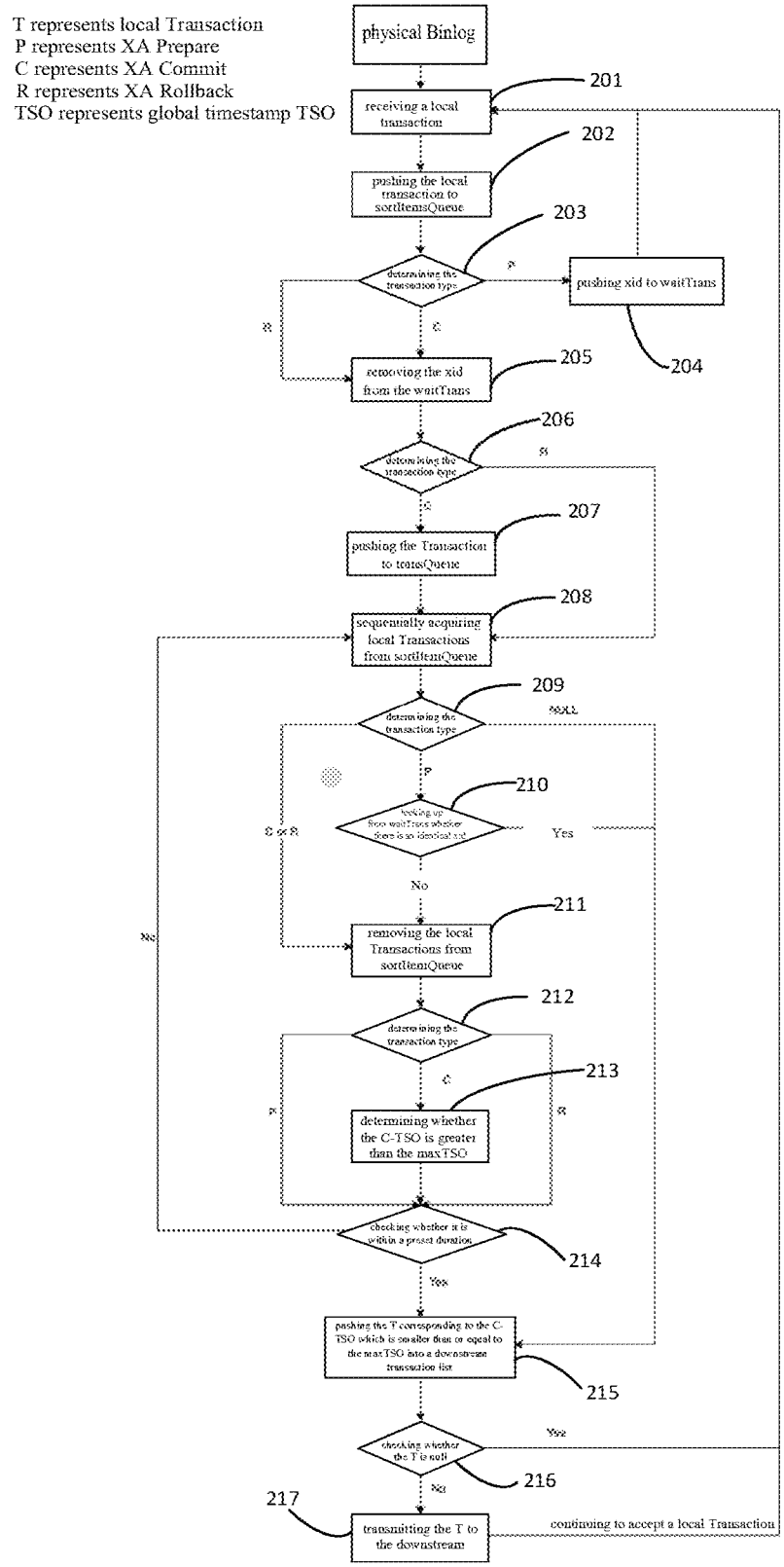
FIG. 2 is a flow diagram of generation process of a first-level sorting queue in the present application.

FIG. 2 shows a flow diagram of generation process of a first-level sorting queue in the present application. As shown in FIG. 2, during specific implementation, in the embodiments in the present application, a first-level sorting queue may be generated in the following manner.

At Step S201, XA Event (local transaction shown in the Figure) in the physical binary log Binlog is read. At Step S202, the read XA Event may be pushed into a preset sorting item queue sortItemsQueue. During the reading process. Step S203 is executed to determine the transaction type of the read a XA Event. When a XA Prepare is read. Step S204 may be executed to push xid into a preset waiting transmission queue waitTrans. When a XA Commit or XA Rollback is read, Step S205 may be executed to remove xid from waitTrans. At Step S206, it is determined the transaction type of the read XA Event. When a XA Commit is read, Step S207 may be executed to push the Transaction corresponding to XA Commit into a preset transmission queue transQueue. After reading the XA Event in the sortItemsQueue, Step S208 may be executed to sequentially acquire XA Events from sortItemsQueue. In the process of acquiring XA Events from sortItemsQueue, Step S209 may be executed to determine the transaction type of the acquired XA Events. When a XA Prepare is acquired, xid may be extracted. Afterwards, Step S210 may be executed to look up from waitTrans whether there is an identical xid. If there is no identical xid, Step S211 may be executed to remove XA Prepare from sortItemsQueue, and Step S209 may be executed again. If there is an identical xid, a loop may be exited to stop acquiring XA Event from sortItemsQueue. At Step S209, when a XA Commit is acquired, Step S211 may be executed to remove XA Commit from sortItemsQueue. When a XA Rollback is acquired. Step S211 may be executed to remove XA Rollback from sortItemsQueue. After Step S211, Step S212 may be executed to determine the transaction type of XA Event removed from the sortItemsQueue. When the removed XA is a XA Commit, Step S213 may be executed to determine a maximum timestamp maxTSO in transQueue and determine whether a global timestamp TSO corresponding to XA Commit is greater than the maxTSO. If the global timestamp TSO corresponding to the XA Commit is smaller than or equal to the maxTSO, Step S214 may be executed to determine whether a duration of the acquired XA is within a preset duration. If the duration of the acquired XA exceeds a preset duration, a loop may be exited or Step S208 may be executed. If a duration of the acquired XA Event is within a preset duration, Step S215 may be executed, by means of which a corresponding Transaction with C-TSO smaller than or equal to the maxTSO may be acquired and pushed into a downstream transaction list. If a global timestamp TSO corresponding to the XA Commit is greater than the maxTSO, the global timestamp TSO may be used as a new maximum timestamp maxTSO. After Step S215 is completed, Step S216 may be executed to determine whether the Transaction is null. If the Transaction is null, a loop may be exited, or Step S201 may be executed. If the Transaction is not null, Step S217 may be executed to transport the transQueue to the downstream, and create a local transaction list by using Transaction with TSO smaller than or equal to the maxTSO in the transQueue as a safe transaction, and generate the first-level sorting queue by using the global transaction list, where the first-level sorting queue is composed of ordered local Transactions. Afterwards, Step S201 may be executed to continue to receive a local transaction or Step S204 may be executed to exit the loop.

Figure 3:
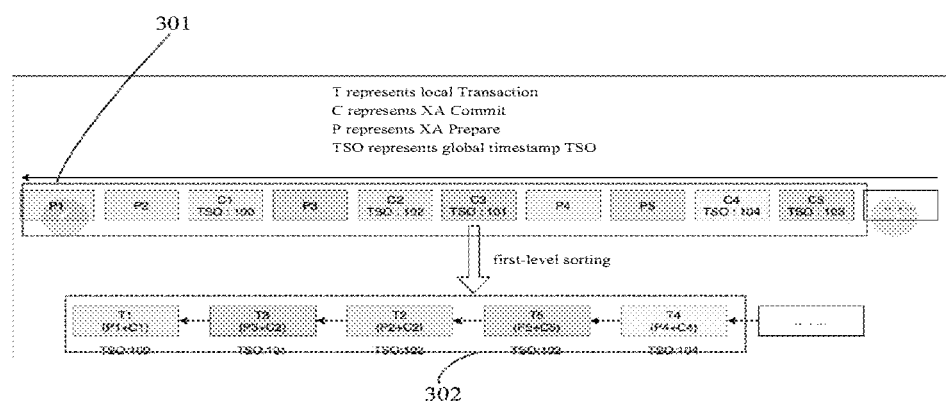
FIG. 3 is a schematic diagram of a first-level sorting queue in the present application.

With reference to a schematic diagram of a first-level sorting queue in the present application shown in FIG. 3, a read XA Event may be pushed into a preset sorting item queue sortItemsQueue. At the time, the XA Event301 in sortItemsQueue is unordered, and the Transaction302 in transQueue may include corresponding XA Prepare, XA Commit, and global timestamp TSO. Moreover, the Transaction in the transQueue may be an ordered sequence sorted according to the global timestamp TSO.

In order to enable those skilled in the art to have better understanding of the embodiments of the present application, a complete example is provided below to describe how a first-level sorting queue is generated by sorting local transactions XA of respective data nodes DNs in the embodiments of the present application.

T represents a local Transaction: P represents XA Prepare: C represents XA Commit: R represents XA Rollback: TSO represents a global timestamp TSO.

Step 1: pulling and consuming transaction logs according to the natural sequence of a Binlog file.

Step 2: putting a P, C, or R when received each time, to sortItemsQueue.

Step 3: extracting xid hold by a P once received each time, and putting the xid to waitTrans.

Step 4: extracting xid hold by an R once received each time, and removing xid from waitTrans.

Step 5: extracting xid hold by a C once received each time, and removing xid from waitTrans.

Step 6: extracting T hold by a C once received each time, and putting T to transQueue:

Step 7: for each C received, after completing the operations in steps 2, 5, and 6 above, perform the following operations to obtain a transactions list that can be output outward.

a. starting a while loop, and setting a loop timeout:

In an embodiment, the operation a above may include processing below: i. acquiring an element from the queue header of sortItemsQueue and denoting it as Item, exiting a loop when the Item is null, and continuing the loop when the Item is not null; ii. if the Item is a P, extracting xid hold by the P, and then determining whether a corresponding C is received through waitTrans: if the corresponding C is received, removing the Item from sortItemsQueue, and jumping to Step i to continue the next round: if the corresponding C is not received, directly exiting the while loop: iii. If the Item is a C or R, removing the Item from sortItemsQueue, and then comparing Commit TSO of the C with a current maxTSO; if the TSO of the C is greater than the maxTSO, replacing the maxTSO with the TSO of the C: seeing whether it has timed out: if not, skipping to Step i to continue the next loop: if it has timed out, exiting the while loop.

b. acquiring all Transactions with smaller than or equal to maxTSO from transQueue, configuring a local transaction list; outputting the transactions to the downstream if the list is not null (these transactions may be outputted safely to the outside, which may be proved by Theorem 3).

Step 8. returning to Step 1 to continue processing.

Certainly, it is feasible for those skilled in the art to perform first-level sorting by using other algorithms in light of actual needs, and it is not necessary to impose a limitation thereon in the present application.

In some embodiments, the Step S104 of performing the multiplexed merge sorting on the first-level sorting queue of each DN to generate the global sorting queue may include the following steps: pushing Transactions in the first-level sorting queue in the local transaction list into a preset global transaction queue: sorting Transactions in the global transaction queue by using the TSO to generate the global sorting queue.

Exemplarily, after a local transaction list is constructed in the embodiments of the present application, Transactions may be transported to the downstream. That is, a first-level sorting queue corresponding to each physical Binlog at least includes a local Transaction. In the embodiments of the present application, Transactions in the physical binary logs Binlogs corresponding to respective data nodes DNs may be pushed into a preset global transaction queue, and then a transaction with a minimum global timestamp TSO may be output to the downstream of the global transaction queue. A loop is performed repeatedly to obtain a boundless global sorting queue.

Certainly, it is feasible for those skilled in the art to perform global sorting in light of actual needs, and it is not necessary to impose a limitation thereon in the present application.

In some embodiments, the Step 106 of merging, for the global sorting queue, local Transactions with an identical global timestamp TSO and generating a global binary log Binlog may include the following steps: sequentially reading Transactions in the global sorting queue, and determining whether the global timestamp is changed: generating a complete global transaction by merging Transactions with an identical global timestamp TSO if the global timestamp is changed: extracting a characteristic Event of the complete global transaction in the global sorting queue; deleting the characteristic Event, and generating a global binary log Binlog by using the complete global transaction in the global sorting queue.

Exemplarily, merging local transactions XAs may be implemented on the basis of a global sorting queue. When a Commit TSO Rotation appears each time, this represents occurrence of changes in the global timestamp. That is, this means that the end of the previous XA and the beginning of a new XA, on the basis of which, different XAs are distinguished. It may be known form the above that with regard to the same Transaction, all DNs associated with the same Transaction have an identical TSO, and thus local transactions dispersed to respective DNs may be merged to a complete transaction. Moreover, during the merging process, characteristic Events corresponding XA characteristics such as XA Start, XA End, XA Prepare may be eliminated, and only the stand-alone characteristic Event is retained.

In the embodiments of the present application, characteristic events of transactions may be deleted before generating a global binary log Binlog, thereby eliminating the complexity of the global binary log Binlog.

In some embodiments, a query log RowsQueryLogEvent may be further added for a complete global transaction in the global binary log Binlog, where the RowsQueryLogEvent is used to record a global timestamp TSO corresponding to the complete global transaction.

Exemplarily, an event in the type of RowsQueryLogEvent may be loaded after each XA for a global binary log Binlog by comparing the global binary log Binlog generated by the global sorting queue with Binlog of the native MySQL. The RowsQueryLogEvent may be used to record a global timestamp TSO of each transaction with a purpose of supporting failure recovery. When a chain that produces a global binary log Binlog is interrupted or restarted, a chain recovery may be performed on the basis of the last global timestamp TSO recorded in a file. The added RowsQueryLogEvent may conform to the database dump MySQL Dump protocol, the event will be ignored by a downstream system which cannot sense the internal details of a distributed system, and this will not affect subscription consumption.

Similarly, in the embodiments of the present application, a Dump program may be further implemented with reference to MySQL, that is, it may provide the external consumption subscription capability. The downstream system may consume a global binary log Binlog of a distributed database like subscription of the stand-alone MySQL Binlog.

In the embodiments of the present application, RowsQueryLogEvent that satisfy the database dump MySQL Dump protocol may be added into the XA in the global binary log Binlog, so that a global binary log Binlog is compatible with a file format of MySQL Binlog and Dump protocol, which in turns can make the downstream system unable to perceive the internal details of a distributed system, and will not affect subscription consumption.

In some embodiments, the global binary log Binlog may have a corresponding logical library table which may have a corresponding logical library table name. The physical binary log Binlog may have a corresponding physical library table which may have a corresponding physical library table name. The logical library table name may be used to replace the physical library table name when the global binary log Binlog is generated. The logical library table and the physical library table may have a mapping relationship which may be acquired by a metadata system for the distributed database.

Exemplarily, after Transactions are merged, the physical library table name in the physical Binlog may be replaced by the logical library table name to realize that the global binary log Binlog can be directly visible and usable to the outside. The mapping relationship between the physical library table and the logical library table may be acquired by a metadata system of a distributed database.

Figure 4:
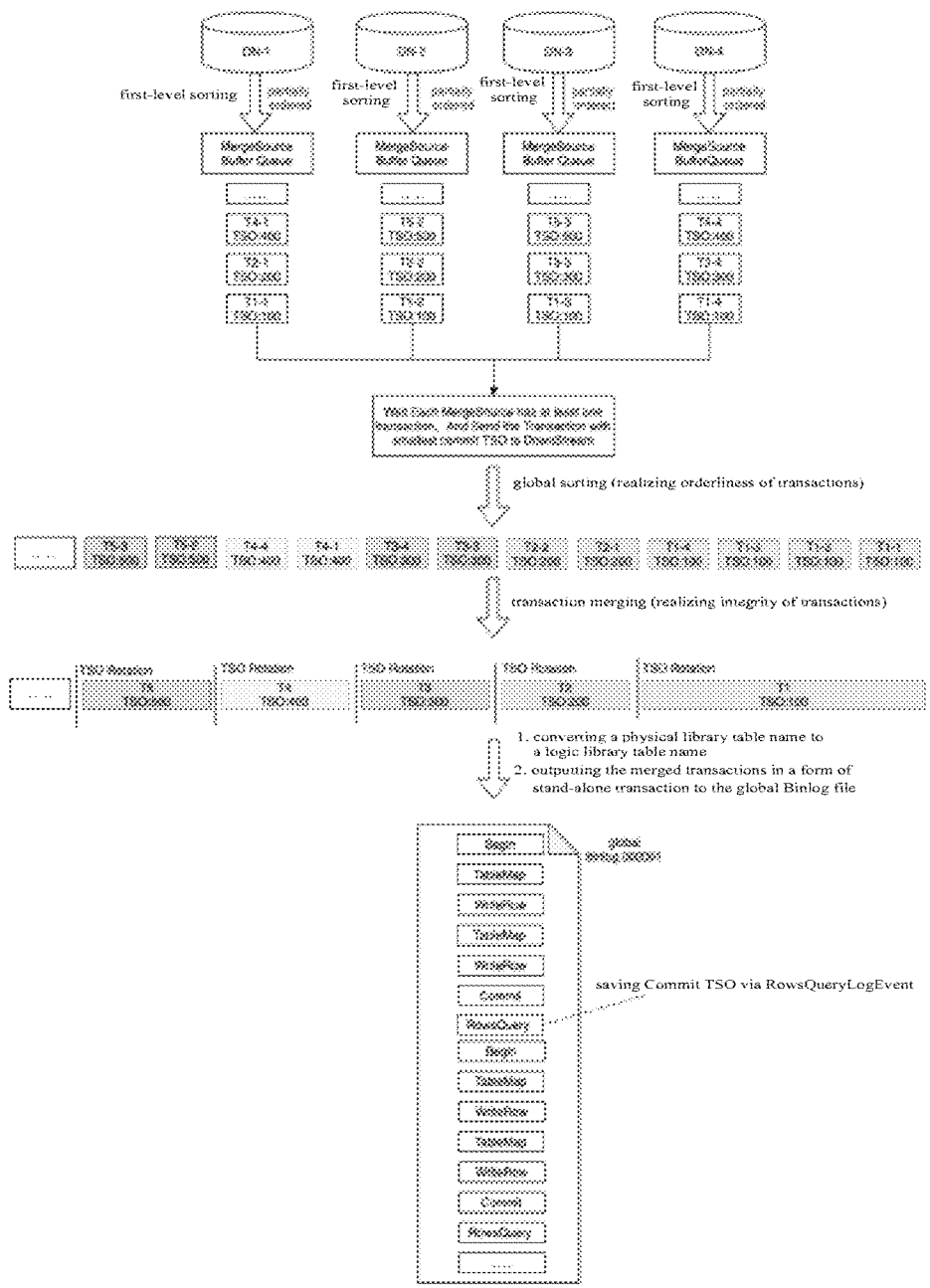
FIG. 4 is a flow diagram of generation process of a global binary log Binlog in the present application.

As shown in FIG. 4, FIG. 4 is a flow diagram of generation process of a global binary log Binlog in the present application. The core of the embodiments in the present application lies in sorting which is based on a global timestamp TSO. In practical applications, the embodiments of the present application may be used in a core component of MySQL CDC. For an XA, at least one DN will participate therein. For the same Transaction, global timestamps TSOs on all DNs participating in the transaction may be identical. As determined by the characteristic of an XA, a global timestamp TSO is not naturally ordered in the physical Binlog of each DN. As such, a first-level sorting queue may be generated first by performing first-level sorting for each DN, and multiplexed merge may be performed on local transactions in a local transaction list of all DNs on the basis that the first-level sorting queue is generated. Moreover, a global sorting queue may be generated by means of global sorting. On the basis of global orderliness, XAs holding an identical global timestamp TSO may be merged into a complete transaction, and a global binary log Binlog may be generated. The generated global binary log Binlog is output in a form of the stand-alone transaction of MySQL.

In the embodiments of the present application, Transactions in the transQueue are sorted by using the global timestamp TSO, a local transaction list is created through the XA Event and the waitTrans in transQueue, and a first-level sorting queue is generated according to the local transaction list. Multiplexed merge sorting is performed on the first-level sorting queues of each DN to generate a global sorting queue. For the global sorting queue, local Transactions with an identical global timestamp TSO are merged, and a global binary log Binlog is generated. The embodiments of the present application can ensure that transactions have global orderliness and integrity during data replication in a distributed database. Meanwhile, a strong consistency effect may also be achieved, and therefore data replication may be implemented in the scenario of high requirements for data consistency. For example, in the transfer scenario, a user may always find a correct result when querying the total account balance in a backup database. In addition, the global binary log Binlog is fully compatible with the Binlog format of native MySQL in terms of data format, and has a strong ecological compatibility.

Further, in the embodiments of the present application, by using the TSO strategy, a distributed MVCC is implemented based on a global timestamp TSO, which enables a distributed database to have correct linearizability and good performance. Meanwhile, a distributed local transaction XA is converted into a global binary log Binlog of the stand-alone transaction log format, which meets the requirements for strong data consistency. Further, characteristic events of a transaction are deleted before a global binary log Binlog is generated, thereby eliminating the complexity of the global binary log Binlog. Additionally, RowsQueryLogEvent that satisfy the database dump MySQL Dump protocol may be added into the XA in the global binary log Binlog, so that a global binary log Binlog is compatible with a file format of MySQL Binlog and Dump protocol, which in turns can make the downstream system unable to perceive the internal details of a distributed system, and will not affect subscription consumption.

It should be noted that for simple description, a method embodiment is expressed as a combination of a series of actions. However, those skilled in the art should be aware that the embodiments in the present application are not limited by the sequences of actions described because according to the embodiments of the present application, certain steps may be performed in other order or simultaneously. Secondly, those skilled in the art should also be aware that the embodiments described in the description are preferred embodiments, and thus the actions involved are not definitely essential to the embodiments of the present application.

On the basis of the above embodiments, the embodiments further provides a data processing system for a distributed database which is applied in an electronic device such as a terminal device and a server.

Figure 5:
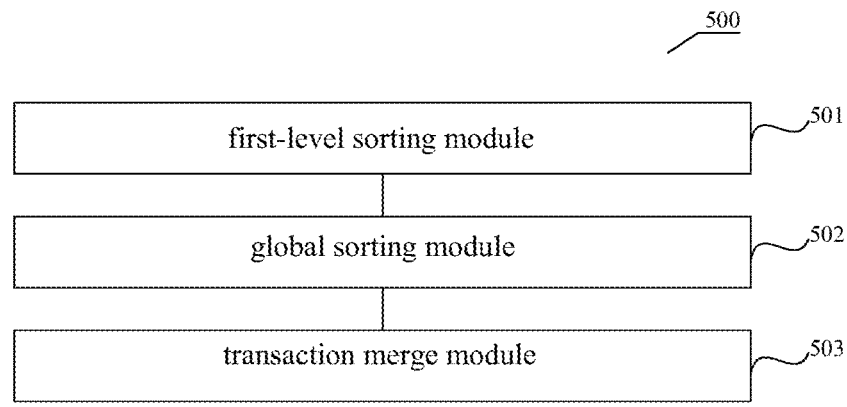
FIG. 5 is a structural block diagram of an embodiment of a data processing system for a distributed database in the present application.

With reference to FIG. 5 below; a data processing system for a distributed database according to the present application is illustrated. FIG. 5 shows a structural block diagram of an embodiment of a data processing system for a distributed database 500 in the present application. The data processing system 500 may specifically include the following modules: a first-level sorting module 501 for sorting Transactions in a transQueue by using the global timestamp TSO, creating a local transaction list through the XA Event and waitTrans in the transQueue, and generating a first-level sorting queue according to the local transaction list: a global sorting module 502 for performing a multiplexed merge sorting on first-level sorting queue of each DN to generate a global sorting queue: a transaction merge module 503 for merging, for the global sorting queue, local Transactions with an identical global timestamp TSO and generating a global binary log Binlog.

In some implementations, the XA is at least associated with one of the DNs. For the same XA, all local Transactions on the DNs associated with the same XA have an identical TSO.

In some implementations, the XA Event may include first-phase commit information XA Prepare, second-phase commit information XA Commit, and rollback information XA Rollback. For a local Transaction, the XA Prepare, the XA Commit, and the XA Rollback have an identical transaction identifier xid. The first-level sorting module 501 may include: a local transaction reading submodule which may be used to read the XA Event in the physical binary logs Binlogs, and push the XA Event read into a preset sorting item queue sortItemsQueue: an identifier pushing submodule which may be used to push the xid into a preset waiting transmission queue waitTrans when the XA Prepare is read: an identifier removal submodule which may be used to remove the xid from the waitTrans when the XA Commit or the XA Rollback is read: a local transaction pushing submodule which may be used to merge XA Prepare corresponding to the XA Commit through the xid, generate a local Transaction when the XA Commit is read, and pushing the Transaction into a preset transQueue: a local transaction list generation submodule which may be used to sort Transactions in the transQueue by using the global timestamp TSO, create the local transaction list through the XA Event and the waitTrans in the transQueue, and generate the first-level sorting queue according to the local transaction list.

In some implementations, the local transaction list generation submodule may further include: sequentially acquire the XA Event from the sortItemsQueue: an identifier determination unit which may be used to extract the xid when the XA Prepare is acquired, and determine whether the XA Commit with an identical xid is received, call a first transaction removal unit if the XA Commit with the identical xid is received, call a first acquisition stopping unit if the XA Commit with the identical xid is not received: the first transaction removal unit which may be used to remove the XA Prepare from the sortItemsQueue, and acquire a XA Event from the sortItemsQueue again: the first acquisition stopping unit which may be used to stop acquiring a XA Event from the sortItemsQueue: a second transaction removal unit which may be used to remove the XA Commit from the sortItemsQueue when the XA Commit is acquired: a third transaction removal unit which may be used to remove the XA Rollback from the sortItemsQueue when the XA Rollback is acquired: a timestamp determination unit which may be used to determine a maximum timestamp maxTSO in the trans- Queue, and determine whether the global timestamp TSO corresponding to the XA Commit is greater than the maxTSO, call a timestamp replacement unit if the global timestamp TSO corresponding to the XA Commit is greater than the maxTSO: the timestamp replacement unit which may be used to use the global timestamp TSO as a new maximum timestamp maxTSO: a local transaction list creation unit which may be used to create a local transaction list by using Transactions with a TSO smaller than or equal to the maxTSO in the transQueue as safe transactions, and generate the first-level sorting queue by using the local transaction list, where the first-level sorting queue is composed of ordered local Transactions.

In some embodiments, the transaction acquisition sub-module may further include: a transaction null set determination unit which may be used to determine whether the XA Event acquired from the sortItemsQueue is null, call a second acquisition stopping unit if the XA Event acquired from the sortItemsQueue is null: the second acquisition stopping unit which may be used to stop acquiring the XA Event from the sortItemsQueue.

In some embodiments, the transaction acquisition sub-module may further include: a duration determination unit which may be used to determine whether a duration of the XA Event acquired from the sortItemsQueue exceeds a preset threshold, call a third acquisition stopping unit if the duration of the XA Event acquired from the sortItemsQueue exceeds a preset threshold: the third acquisition stopping unit which may be used to stop the XA Event acquired from the sortItemsQueue.

In some embodiments, the global sorting module 502 may include: a transaction pushing submodule which may be used to push Transactions of the first-level sorting queue in the local transaction list into a preset global transaction queue: a global sorting submodule which may be used to sort Transactions in the global transaction queue by using the TSO to generate the global sorting queue.

In some embodiments, the XA may have rollback information Commit TSO Rotation. The transaction merge module 503 may include: a global timestamp change determination submodule which is used to sequentially read Transactions in the global sorting queue, and determine whether the global timestamp is changed, call a complete global transaction generation submodule when the global timestamp is changed: the complete global transaction generation submodule which is used to generate a complete global transaction by merging Transactions with an identical global timestamp TSO: a characteristic event extraction submodule for extracting a characteristic Event of the complete global transaction in the global sorting queue: a characteristic event deletion submodule for deleting the characteristic Event, and generating a global binary log Binlog by using the complete global transaction in the global sorting queue.

In some embodiments, the data process system of the embodiments of the present application may further include: a query log addition module which may be used to add, for the complete global transaction, a query log RowsQueryLogEvent in the global binary log Binlog, where the RowsQueryLogEvent is used to record the global timestamp TSO corresponding to the complete global transaction.

Optionally, the global binary log Binlog may have a corresponding logical library table which may have a corresponding logical library table name. The physical binary log Binlog may have a corresponding physical library table which may have a corresponding physical library table name. The logical library table name may be used to replace the physical library table name when the global binary log Binlog is generated. The logical library table and the physical library table may have a mapping relationship which may be acquired by a metadata system of the distributed database.

The embodiments of the present application further provide a nonvolatile readable storage medium stored thereon with one or more modules (programs) which, when applied in a device, may enable the device to execute instructions of respective method steps in the embodiments of the present application.

The embodiments of the present application provide one or more machine-readable media stored thereon with instructions which, when executed by one or more processors, enable an electronic device to execute the one or more methods in the embodiments above. In the embodiments of the present application, the electronic device includes various devices such as a terminal device and a server (cluster).

Figure 6:
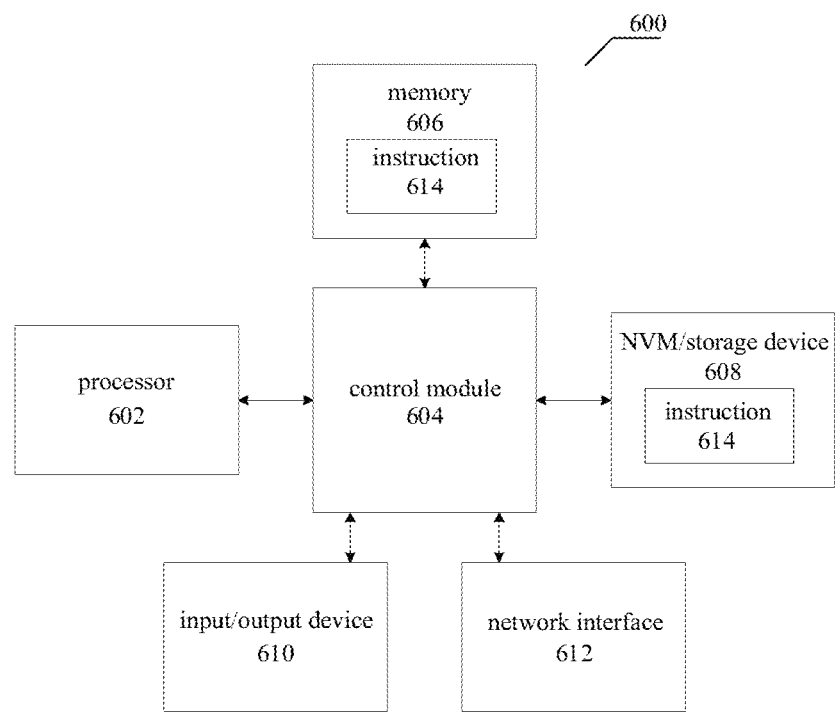
FIG. 6 is a schematic structural diagram of a system in an embodiment of the present application.

The embodiments of the disclosure may be implemented as a system which is intended to be configured by using any proper hardware, firmware, software, or any combinations thereof. The system may include an electronical device such as terminal device and server (cluster). FIG. 6 schematically shows an exemplary system 600 that may be used to implement the respective embodiments in the present application.

For an embodiment, FIG. 6 shows an exemplary system 600. The system 600 has one or more processors 602, at least one control module (chipset) 604 coupled to (one or more) processors 602, a memory 606 coupled to the control module 604, a nonvolatile memory (NVM)/storage device 608 coupled to the control module 604, one or more input/output devices 610 coupled to the control module 604, and a network interface 612 coupled to the control module 604.

The processors 602 may include one or more single-core or multi-core processors. The processors 602 may include any combinations of general-purpose processors or special-purpose processors (e.g., graphics processor, application processor, baseband processor and so forth). In some embodiments, a system 600 can be used as a device such as the terminal device or server (cluster).

In some embodiments, a system 600 may include one or more computer-readable media (e.g., memory 606 or NVM/storage device 608) with an instruction 614 and one or more processors 602 fitted with the one or more computer readable media and configured to execute the instruction 614 to implement a module so as to execute the actions in the disclosure.

For an embodiment, a control module 604 may include any proper interface controller so as to provide any proper interface to any proper device or subassembly in communication with at least one of (one or more) processors 602 and/or a control module 604.

The control module 604 may include a memory controller module so as to provide an interface to a memory 606. The memory controller module may be a hardware module, a software module and/or a firmware module.

The memory 606 may be used to load and store data and/or an instruction 614 for a system 600 for example. For an embodiment, the memory 606 may include any proper volatile memory, e.g., a proper DRAM. In some embodiments, the memory 606 may include a Double Data Rate Type IV Synchronous Dynamic Random Access Memory (DDR4SDRAM).

For an embodiment, a control module 604 may include one or more input/output controllers so as to provide interfaces to an NVM/storage device 608 and (one or more) input/output devices 601.

For example, the NVM/storage device 608 may be used to store data and/or an instruction 614. The NVM/storage device 608 may include any proper nonvolatile memory (e.g., a flash memory) and/or may include any proper (one or more) nonvolatile storage device (e.g., one or more hard disk drives (HDD)), one or more compact disc (CD) drives, and/or one or more digital versatile disk (DVD) drives).

The NVM/storage device 608 may include storage sources that are physically a part of a device on which system 600 is installed, or is accessible to the device, not necessary as a part of the device. For example, the NVM/storage device 608 is accessible through (one or more) input/output devices 610 via a network.

The (one or more) input/output devices 610 may provide interfaces for a system 600 so as to communicate with other proper devices. The input/output devices 610 may include a communication component, an audio component, a sensor component, and so forth. The network interface 612 may provide an interface for a system 600 so as to communicate via one or more networks. The system 600 may communicate with one or more components wirelessly according to one or more wireless network standards and/or any standard in a protocol and/or the protocol, for example, a wireless network based on a communication standard, such as WiFi, 2G, 3G, 4G, and 5G, or wirelessly communicate with their combination.

For an embodiment, at least one of (one or more) processors 602 may be logically encapsulated with one or more controllers (e.g., a memory controller module) of a control module 604. For an embodiment, at least one of (one or more) processors 602 may be logically encapsulated with one or more controllers of a control module 604 to form a system in package (SiP). For an embodiment, at least one of (one or more) processors 602 may be logically integrated with one or more controllers of a control module 604 on the same mold. For an embodiment, at least one of (one or more) processors 602 may be logically integrated with one or more controllers of a control module 604 on the same mold to form a system on chip (SoC).

In respective embodiments, a system 600 may be but not limited to a server, a desktop computing device or a mobile computing device (e.g., laptop computing device, handheld computing device, tablet computer, netbook, and so forth). In respective embodiments, a system 600 may have more or fewer components and/or different architectures. For example, in some embodiments, a system 600 includes one or more cameras, a keyboard, a liquid crystal display (LCD) screen (including a touch-screen display), a nonvolatile memory port, a plurality of antennas, a graphics chip, an application-specific integrated circuit (ASIC), and a loudspeaker.

A main control chip may be used as a processor or a control module in a detection system. Sensor data, location information and so forth are stored in a memory or NVM/storage device. A sensor group may be used as an input/output device, and a communication interface may include a network interface.

For system embodiments, since they are basically similar to method embodiments, the descriptions thereto are relatively simple. For relevant parts, reference may be made to the parts of the description of the method embodiments.

MySQL as one of the most mainstream databases at present has an excellent ecological basis. It is also a mainstream development direction at present to construct a distributed database on the basis of the thought of the distributed MySQL Sharding (sharded MySQL). Up to now; there was still no technical solution which may ensure the global orderliness and integrity of transactions when data replication is performed, for the distributed MySQL Sharding architecture. In the embodiments of the present application, Transactions in the transQueue are sorted by using a global timestamp TSO, a local transaction list is created through the XA Event and the waitTrans in transQueue, and a first-level sorting queue is generated according to the local transaction list. A multiplexed merge sorting is performed on the first-level sorting queue for respective DNs to generate a global sorting queue. For the global sorting queue, local Transactions with an identical global timestamp TSO are merged, and a global binary log Binlog is generated. The embodiments of the present application can ensure that transactions have global orderliness and integrity during data replication in a distributed database. Meanwhile, a strong consistency effect may also be achieved, and therefore data replication may be implemented in the scenario of high requirements for data consistency. For example, in the transfer scenario, a user may always find a correct result when querying the total account balance in a backup database. In addition, the global binary log Binlog is fully compatible with the Binlog format of native MySQL in terms of data format, and has a strong ecological compatibility.

Embodiments of the description are described in a progressive manner, with each embodiment focusing on the differences from other embodiments. It is sufficient to refer to the respective embodiments to each other for identical and similar parts.

The embodiments of the present application is described with reference to flow diagrams and/or a block diagram of the method, terminal device (system), and computer program product according to the embodiments of the present invention. It should be understood that each flow and/or block in the flow diagrams and/or block diagram as well as a combination of a flow and/or block in the flow diagrams and/or block diagram may be implemented by computer program instructions. These computer program instructions may be provided to general-purpose computers, special-purpose computers, embedded processors or processors of other programmable data processing devices to generate a machine, such that the instructions executed by the computers or the processors of the other programmable data processing devices produce a device for carrying out the functions specified in one or more of the flows of the flowchart and/or one or more of a block or multiple blocks in the block diagram.

These computer program instructions may also be stored in a computer-readable memory capable of directing a computer or the other programmable data processing device to operate in a particular manner, such that the instructions stored in the computer-readable memory produce an article of manufacture including an instructional device that implements a function specified in one or more flows of a flow diagram and/or one or more blocks of a block diagram.

These computer program instructions may also be loaded in computers or other programmable data processing devices such that a series of operating steps are executed on the computers or other programmable devices to produce computer-implemented processing, such that the instructions executed on the computers or other programmable devices provide steps for implementing a function specified in one or more flows of a flow diagram and/or one or more blocks of a block diagram.

Although preferred embodiments of the embodiments in the present application are described, those skilled in the art may make additional modifications and amendments to these embodiments once knowing the basic inventive concept. As such, the claims attached are intended to be illustrated as including the preferred embodiments and all modifications and amendments that fall within the scope of the embodiments of the present application.

At last, what needs to be further illustrated is that: relational terms such as first and second are only used to distinguish an entity or operation from another entity or operation, but not definitely requiring or suggesting there is any such actual relationship or sequence between these entities or operations. Moreover, the terms "include" and "comprise" or any other variant thereof are intended to cover non-exclusive inclusion such that a process, method, commodity or system including a series of elements not only includes those elements, but also includes other elements not expressly listed or further includes elements that are inherent to the process, method, commodity or system. Without further limitation, an element defined by the phrase "comprising one . . . " does not exclude the circumstance where there is still another identical element in the process, method, commodity or system including the element.

A data processing method and system for a distributed database, an electronic device, and a storage medium provided in the present application are introduced in a detailed manner above. The principle and embodiments of the present application are illustrated by using specific individual examples herein. The illustration of the embodiments described above are only for helping to understand the method and core thought of the present application. Meanwhile, those skilled in the art may make modifications in terms of embodiments and applicable scope according to the thought of the present application. To sum up, the contents in the description shall not be understood as limitation to the present application.

What is claimed is:

1. A data processing method for a distributed database, wherein the distributed database has a plurality of data nodes (DN) which have corresponding physical binary logs (physical Binlogs) for storing local transaction operation information (XA Event) of a distributed transaction (XA), the XA at least comprising one local Transaction composed of the XA Event, the XA having a corresponding global timestamp (TSO), the method comprising:
    sorting local Transactions in a preset transmission queue by using the TSO, creating a local transaction list through the XA Event and a preset waiting transmission queue in the transQueue, and generating a first-level sorting queue according to the local transaction list, wherein the preset transmission queue is transQueue, and the preset waiting transmission queue is waitTrans;
    performing a multiplexed merge sorting on the first-level sorting queue of each DN to generate a global sorting queue; and
    merging, for the global sorting queue, local Transactions with an identical TSO, and generating a global binary log (global Binlog).

2. The method according to claim 1, wherein the XA is at least associated with one of the DNs, and for a same XA, all local Transactions on the DNs associated with the same XA have an identical TSO.

3. The method according to claim 1, wherein the XA Event comprises first-phase commit information XA Prepare, second-phase commit information XA Commit, and rollback information XA Rollback; for a local Transaction, the XA Prepare, the XA Commit, and the XA Rollback have an identical transaction identifier (xid), the step of creating a local transaction list through the XA Event and a waitTrans in the transQueue comprising:
    reading the XA Event in the physical Binlogs, and pushing the read XA Event into a preset sorting item queue (sortItemsQueue);
    pushing the xid into the waitTrans, when the XA Prepare is read,
    removing the xid from the waitTrans, when the XA Commit or the XA Rollback is read;
    merging the XA Prepare corresponding to the XA Commit through the xid to generate a local Transaction when the XA Commit is read, and pushing the local Transaction into the transQueue; and
    sorting local Transactions corresponding to respective physical Binlogs to create the local transaction list, and generating the first-level sorting queue according to the local transaction list.

4. The method according to claim 3, wherein the step of creating the local transaction list through the XA Event and the waitTrans in the transQueue further comprises:
    sequentially acquiring the XA Event from the sortItemsQueue;
    extracting the xid when the XA Prepare is acquired, and determining whether the XA Commit with an identical xid is received;
    removing the XA Prepare from the sortItemsQueue when the XA Commit with the identical xid is received, and acquiring the XA Event from the sortItemsQueue again;
    stopping acquiring the XA Event from the sortItemsQueue when the XA Commit with the identical xid is not received;
    removing the XA Commit from the sortItemsQueue when the XA Commit is acquired;
    removing the XA Rollback from the sortItemsQueue when the XA Rollback is acquired;
    determining a maximum timestamp (maxTSO) in the transQueue, and determining whether a TSO corresponding to the XA Commit is greater than the maxTSO;
    using the TSO as a new maxTSO when the TSO corresponding to the XA Commit is greater than the maxTSO;
    creating a local transaction list by using local Transactions with a TSO smaller than or equal to the maxTSO in the transQueue as safe transactions, and generating the first-level sorting queue by using the local transaction list, wherein the first-level sorting queue is composed of ordered local Transactions.

5. The method according to claim 4, after the step of sequentially acquiring the XA Event from the sortItemsQueue, further comprising:
    determining whether the XA Event acquired from the sortItemsQueue is null;
    stopping acquiring the XA Event from the sortItemsQueue when the XA Event acquired from the sortItemsQueue is null.

6. The method according to claim 4, after the step of sequentially acquiring the XA Event from the sortItemsQueue, further comprising:

determining whether a duration of the XA Event acquired from the sortItemsQueue exceeds a preset threshold;

stopping acquiring the XA Event from the sortItemsQueue when the duration of the XA Event acquired from the sortItemsQueue exceeds the preset threshold.

7. The method according to claim 1, wherein the step of performing the multiplexed merge sorting on the first-level sorting queue of each DN to generate the global sorting queue comprises:

pushing local Transactions in the first-level sorting queue in the local transaction list into a preset global transaction queue;

sorting local Transactions in the global transaction queue by using the TSO to generate the global sorting queue.

8. The method according to claim 1, wherein the step of merging, for the global sorting queue, local Transactions with an identical TSO and generating a global Binlog comprises:

sequentially reading local Transactions in the global sorting queue, and determining whether the TSO is changed;

generating a complete global transaction by merging local Transactions with an identical TSO when the TSO is changed;

extracting a characteristic event (Event) of the complete global transaction in the global sorting queue;

deleting the characteristic Event, and generating a global Binlog by using the complete global transaction in the global sorting queue.

9. The method according to claim 8, further comprising:

adding, for the complete global transaction, a query log RowsQueryLogEvent in the global Binlog, wherein the RowsQueryLogEvent is used to record a TSO corresponding to the complete global transaction.

10. The method according to claim 1, wherein the global Binlog has a corresponding logical library table which has a corresponding logical library table name; the physical Binlog has a corresponding physical library table which has a corresponding physical library table name; the logical library table name is used to replace the physical library table name when the global Binlog is generated; the logical library table and the physical library table have a mapping relationship which is acquired by a metadata system of the distributed database.

11. An electronic device for a distributed database, wherein the distributed database has a plurality of data nodes (DN) which have corresponding physical binary logs (physical Binlogs) for storing local transaction operation information (XA Event) of a distributed transaction (XA), the XA at least comprising one local Transaction composed of the XA Event, the XA having a corresponding global timestamp (TSO), the electronic device comprising:

a processor; and a memory, stored thereon with executable codes which, when executed, enable the processor to:

sort local Transactions in a present transmission queue by using the TSO, create a local transaction list through the XA Event and a preset waiting transmission queue in the transQueue, and generate a first-level sorting queue according to the local transaction list, wherein the preset transmission queue is transQueue, and the preset waiting transmission queue is waitTrans;

perform a multiplexed merge sorting on the first-level sorting queue of each DN to generate a global sorting queue; and merge, for the global sorting queue, local Transactions with an identical TSO, and generate a global binary log (global Binlog).

12. The electronic device according to claim 11, wherein the XA is at least associated with one of the DNs, and for a same XA, all local Transactions on the DNs associated with the same XA have an identical TSO.

13. The electronic device according to claim 11, wherein the XA Event comprises first-phase commit information XA Prepare, second-phase commit information XA Commit, and rollback information XA Rollback; for a local Transaction, the XA Prepare, the XA Commit, and the XA Rollback have an identical transaction identifier (xid), wherein to create a local transaction list through the XA Event and a waitTrans in the transQueue comprises:

reading the XA Event in the physical Binlogs, and pushing the read XA Event into a preset sorting item queue (sortItemsQueue);

pushing the xid into the waitTrans, when the XA Prepare is read, removing the xid from the waitTrans, when the XA Commit or the XA Rollback is read;

merging the XA Prepare corresponding to the XA Commit through the xid to generate a local Transaction when the XA Commit is read, and pushing the local Transaction into the transQueue; and sorting local Transactions corresponding to respective physical Binlogs to create the local transaction list, and generating the first-level sorting queue according to the local transaction list.

14. The electronic device according to claim 13, wherein creating the local transaction list through the XA Event and the waitTrans in the transQueue further comprises:

sequentially acquiring the XA Event from the sortItemsQueue;

extracting the xid when the XA Prepare is acquired, and determining whether the XA Commit with an identical xid is received;

removing the XA Prepare from the sortItemsQueue when the XA Commit with the identical xid is received, and acquiring the XA Event from the sortItemsQueue again;

stopping acquiring the XA Event from the sortItemsQueue when the XA Commit with the identical xid is not received;

removing the XA Commit from the sortItemsQueue when the XA Commit is acquired;

removing the XA Rollback from the sortItemsQueue when the XA Rollback is acquired;

determining a maximum timestamp (maxTSO) in the transQueue, and determining whether a TSO corresponding to the XA Commit is greater than the maxTSO;

using the TSO as a new maxTSO when the TSO corresponding to the XA Commit is greater than the maxTSO;

creating a local transaction list by using local Transactions with a TSO smaller than or equal to the maxTSO in the transQueue as safe transactions, and generating the first-level sorting queue by using the local transaction list, wherein the first-level sorting queue is composed of ordered local Transactions.

15. The electronic device according to claim 14, wherein after sequentially acquiring the XA Event from the sortItemsQueue, the executable codes, when executed, further enable the processor to:

determine whether the XA Event acquired from the sortItemsQueue is null;

stop acquiring the XA Event from the sortItemsQueue when the XA Event acquired from the sortItemsQueue is null.

16. The electronic device according to claim 14, wherein after sequentially acquiring the XA Event from the sortItemsQueue, the executable codes, when executed, further enable the processor to:

determine whether a duration of the XA Event acquired from the sortItemsQueue exceeds a preset threshold;

stop acquiring the XA Event from the sortItemsQueue when the duration of the XA Event acquired from the sortItemsQueue exceeds the preset threshold.

17. The electronic device according to claim 11, wherein performing the multiplexed merge sorting on the first-level sorting queue of each DN to generate the global sorting queue comprises:

pushing local Transactions in the first-level sorting queue in the local transaction list into a preset global transaction queue;

sorting local Transactions in the global transaction queue by using the TSO to generate the global sorting queue.

18. The electronic device according to claim 11, wherein merging, for the global sorting queue, local Transactions with an identical TSO and generating a global Binlog comprises:

sequentially reading local Transactions in the global sorting queue, and determining whether the TSO is changed;

generating a complete global transaction by merging local Transactions with an identical TSO when the TSO is changed;

extracting a characteristic event (Event) of the complete global transaction in the global sorting queue;

deleting the characteristic Event, and generating a global Binlog by using the complete global transaction in the global sorting queue.

19. The electronic device according to claim 18, wherein the executable codes, when executed, further enable the processor to:

add, for the complete global transaction, a query log RowsQueryLogEvent in the global Binlog, wherein the RowsQueryLogEvent is used to record a TSO corresponding to the complete global transaction.

20. One or more non-transitory machine readable medium for a distributed database, wherein the distributed database has a plurality of data nodes (DN) which have corresponding physical binary logs (physical Binlogs) for storing local transaction operation information (XA Event) of a distributed transaction (XA), the XA at least comprising one local Transaction composed of the XA Event, the XA having a corresponding global timestamp (TSO), wherein executable codes are stored on the non-transitory machine readable medium, the executable codes, when executed, enable the processor to:

sort local Transactions in a present transmission queue by using the TSO, create a local transaction list through the XA Event and a preset waiting transmission queue in the transQueue, and generate a first-level sorting queue according to the local transaction list, wherein the preset transmission queue is transQueue, and the preset waiting transmission queue is waitTrans;

perform a multiplexed merge sorting on the first-level sorting queue of each DN to generate a global sorting queue; and merge, for the global sorting queue, local Transactions with an identical TSO, and generate a global binary log (global Binlog).

* * * * *